United States Patent
Huston et al.

(10) Patent No.: US 11,029,402 B2
(45) Date of Patent: Jun. 8, 2021

(54) WIDEBAND GROUND PENETRATING RADAR SYSTEM AND METHOD

(71) Applicants: Dryver R Huston, South Burlington, VT (US); Tian Xia, South Burlington, VT (US); Dylan Burns, South Burlington, VT (US)

(72) Inventors: Dryver R Huston, South Burlington, VT (US); Tian Xia, South Burlington, VT (US); Dylan Burns, South Burlington, VT (US)

(73) Assignee: The University of Vermont and State Agricultural College, Burlington, VT (US)

( * ) Notice: Subject to any disclaimer, the term of this patent is extended or adjusted under 35 U.S.C. 154(b) by 216 days.

(21) Appl. No.: 16/245,628

(22) Filed: Jan. 11, 2019

(65) Prior Publication Data
US 2019/0154826 A1    May 23, 2019

Related U.S. Application Data

(63) Continuation-in-part of application No. 15/063,369, filed on Mar. 7, 2016, now abandoned.

(51) Int. Cl.
| | |
|---|---|
| *G01S 13/88* | (2006.01) |
| *H01Q 13/08* | (2006.01) |
| *G01S 7/03* | (2006.01) |
| *G01S 7/285* | (2006.01) |
| *G01S 7/282* | (2006.01) |
| *H01Q 1/32* | (2006.01) |
| *G01S 13/00* | (2006.01) |

(52) U.S. Cl.
CPC ............ *G01S 13/885* (2013.01); *G01S 7/032* (2013.01); *G01S 7/282* (2013.01); *G01S 7/285* (2013.01); *H01Q 13/085* (2013.01); *H01Q 1/3216* (2013.01)

(58) Field of Classification Search
None
See application file for complete search history.

(56) References Cited

U.S. PATENT DOCUMENTS

| | | | | |
|---|---|---|---|---|
| 4,967,199 A | * | 10/1990 | Gunton ............... | G01S 13/0209 342/158 |
| 5,457,394 A | * | 10/1995 | McEwan ............... | G01F 23/284 324/642 |
| 5,767,953 A | * | 6/1998 | McEwan ................. | G01V 3/12 356/5.01 |
| 5,781,591 A | * | 7/1998 | Wolf ..................... | G01S 7/2922 375/340 |
| 5,900,833 A | * | 5/1999 | Sunlin ................. | G01S 13/0209 342/22 |

(Continued)

*Primary Examiner* — Bernarr E Gregory

(57) ABSTRACT

An improved Ground Penetrating Radar (GPR) system is provided. The system advantageously employs full waveform digitization of a returning signal to significantly reduce the number of launch signals and allowing the amount of radiation emitted to stay within the limit set by the Federal Communications Commission (FCC), while producing a robust information detection signal. In addition, intermittent large latent-duty-cycle sampling employs a less expensive digitizer typically used in prior art GPRs. The system is scalable at low-cost to accommodate multi-antenna multistatic testing for subsurface tomographic imaging.

17 Claims, 21 Drawing Sheets

(56) References Cited

U.S. PATENT DOCUMENTS

| | | | | |
|---|---|---|---|---|
| 5,912,639 | A * | 6/1999 | Beckner | G01S 13/0209 342/176 |
| 6,260,052 | B1 * | 7/2001 | Song | G01S 7/285 708/300 |
| 7,088,088 | B1 * | 8/2006 | Marzalek | G01R 31/2822 324/76.19 |
| 2008/0048905 | A1 * | 2/2008 | McEwan | G01S 13/0209 342/21 |
| 2008/0105048 | A1 * | 5/2008 | Nilsson | G01F 23/284 73/290 V |
| 2013/0151201 | A1 * | 6/2013 | McCorkle | G06F 17/141 702/189 |

* cited by examiner

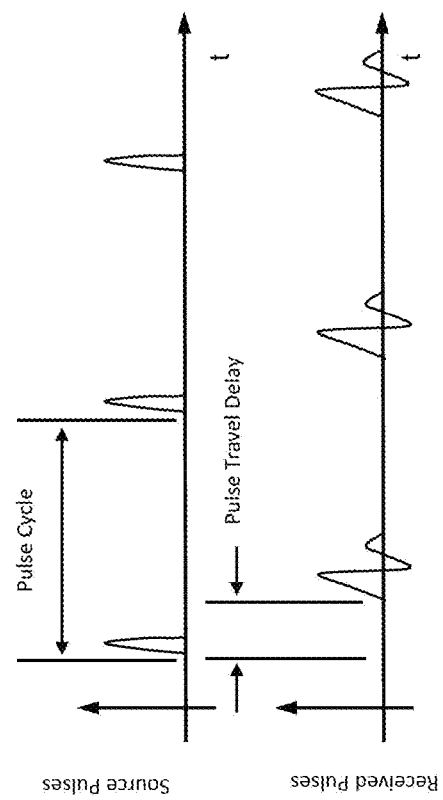
Figure 1 Source and received pulse timing sequence in an I-GPR
PRIOR ART

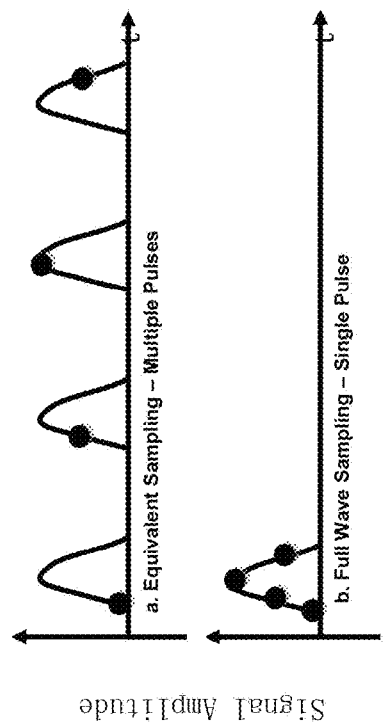

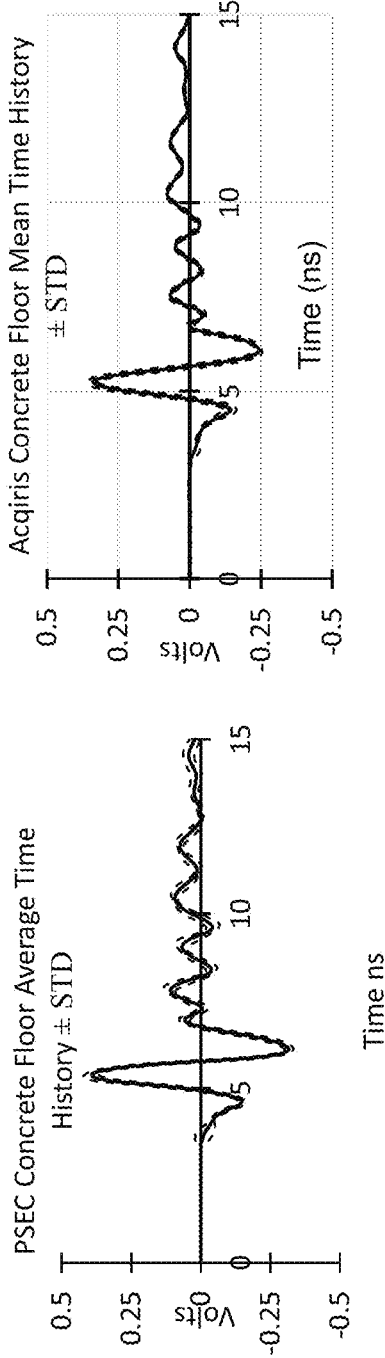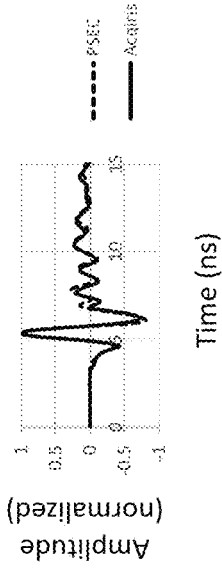
FIG. 12a
FIG. 12b
FIG. 12c

WIDEBAND GROUND PENETRATING RADAR SYSTEM AND METHOD

CROSS-REFERENCE TO RELATED APPLICATIONS

The present application is related to, claims the earliest available effective filing date(s) from (e.g., claims earliest available priority dates for other than provisional patent applications; claims benefits under 35 USC § 119(e) for provisional patent applications), and incorporates by reference in its entirety all subject matter of the following listed application(s) (the "Related Applications") to the extent such subject matter is not inconsistent herewith; the present application also claims the earliest available effective filing date(s) from, and also incorporates by reference in its entirety all subject matter of any and all parent, grandparent, great-grandparent, etc. applications of the Related Application(s) to the extent such subject matter is not inconsistent herewith:

Continuation in part of U.S. patent application Ser. No. 15/063,369, entitled "Ultra Wideband Ground Penetrating Radar", naming Dryver R. Huston as inventor, filed 7 Mar. 2016.

BACKGROUND

1. Field of Use

The invention relates to ground penetrating radar systems for use in surveying pavement structure.

2. Description of Prior Art (Background)

Crumbling and unstable infrastructure in the United States has become an immediate threat to safety of citizens and critical to their identification and repairs is the use of ground penetrating radar systems to scan below the surface for the dangers present themselves to the unequipped observer.

Ground Penetrating Radar ("GPR") systems are used to make measurements of different structures in the ground. These systems are also referred to as impulse ground penetrating radar (I-GPR) systems. Each system incorporates a transmitter having an antenna that radiates or emits a short pulse of radio frequency, typically in the frequency range from 1 MHz to 10 GHz, into the sub-surface medium. GPR systems (compared to other radar systems) are characterized by being able to generate a pulse length which is short with respect to the wavelength of the center frequency being transmitted. In practice, a pulse of 1.0 to 2.0 cycles of the center frequency can be emitted.

Wherever there is a change in the electrical properties in the ground, part of the pulse is reflected and part of the pulse propagates into the next layer. Stated otherwise, waves or pulses are reflected by reflective interfaces defining, upper and lower margins of a sub-surface layer or anomaly. The reflected pulses are detected at the antenna of a receiver.

There are basically two types of GPR antenna systems in use for surveying roadways. The most common antenna type is a transverse electromagnetic transmission, line antenna or "horn" which transmits and detects radio wave energy, typically operating at center frequencies of 0.5 to 5 GHz. The horn antenna is elevated from the road surface to be most effective.

The second antenna type is a resistively loaded dipole system which typically operates at center frequencies of 2 GHz or less. The dipole antenna is usually put on or very near the ground surface and is used in general geotechnical applications and road surveys. For these applications the transmitting and receiving antennas are in contact or almost in contact with the road surface.

The resolution of detection of sub-surface layers or anomalies is a function of the pulse length, and hence of the radio frequency (or wavelength) of the radar signal. Shorter pulse lengths provide better resolution, and it is easier to achieve shorter pulse lengths with a higher center frequency system. Therefore, the horn antenna systems, which tend to operate at higher frequency, enable thinner layers to be resolved.

The depth of penetration through most materials is a function of the operating frequency (or wavelength). Typically, lower frequencies are able to penetrate most materials with less attenuation. Also, better penetration into the ground is achieved when the antennas are coupled closely to the ground surface. Consequently, the surface-coupled antenna systems permit better detection of features at deeper depths.

A horn antenna system operating at a center frequency of about 3 GHz can resolve layers as thin as 50 mm and can detect features to depths of 300 to 500 mm in typical materials. A surface-coupled antenna system operating at a center frequency of about 1 GHz can resolve layers as thin as 100 to 150 mm and can typically detect features to depths of 1 to 2 in.

Typical I-GPR receivers sample the entire waveform cycle, including the long idle times, either with lower-cost multiple-wave-cycle subsampling techniques or single-cycle full-wave digitization with expensive high-speed Analog-to-Digital Converters (ADCs).

I-GPR is useful for detecting and locating objects and subsurface features in large dielectric structures such as geological formations, glaciers, roadways and concrete structures. Subsurface features of interest include material layering, archeological sites, pipes, steel reinforcing, voids, cracking and more complicated forms of damage.

The 1-GPR operating procedure is a cyclic repetition of the following steps: 1. Launch short-duration electromagnetic pulses to probe subsurface features, 2. Receive reflected and scattered waves as short duration transients, 3. Idle for a period that is minimally long enough to receive the return signals and is typically several times longer than that of the transient return pulses, 4. Process and store the received data in background operations, and 5. Repeat the cycle at a rate known as the Pulse Repetition Frequency (PRF).

FIG. 1 shows the timing of the source and received signals. Attractive features of ultra-wideband 1-GPR systems include relatively simple system architecture, wide instantaneous bandwidth, and deep penetration and high-resolution capabilities.

Technical challenges are high speed and high dynamic range signal processing on both the launch and receive ends, managing large amplitude direct coupling signals between launch and receive antennas, and limiting the amount of radiated electromagnetic emissions for regulatory compliance.

Receiver design plays a crucial role for I-GPRs. It determines features of system performance, such as bandwidth, PRF, horizontal coverage, scanning speed, resolution and radiated power emission. The receiver should have a wide bandwidth and high sampling speed, in the order of Giga-samples per second (Gsps). Most modern receivers use an equivalent-time sampling technique, see FIG. 2a. The GPR launches a sequence of nominally identical pulses with sufficient idle time between pulses to receive the entire return transient pulses. The equivalent time receiver collects a single sample from each waveform and constructs a full waveform by slewing the sample time offset while sampling from a minimum of hundreds of launch and receive cycles.

Full waveform digitization is an alternative that can, in principle, collect the same amount of information with many fewer launch and receive cycles, perhaps even one, as shown in FIG. 2b. Full-wave sampling requires high-speed ADCs; and large-bandwidth post-digitization transmission, process and store operations.

Prior art I-GPR receivers sample the entire waveform cycle, including the long idle times before the next pulse transmission, either with lower-cost multiple-wave-cycle subsampling techniques or single-cycle full-wave digitization with expensive high-speed Analog-to-Digital Converters (ADCs).

In light of the above there exists a need for waveform digitization of returning signals to extract useful detection information while significantly reducing the number of launch signals needed, thus allowing the amount of radiation emitted to stay within the limit set by the Federal Communications Commission (FCC).

BRIEF SUMMARY

The present invention provides a real-time, full-wave, low-cost Application Specific Integrated Circuit (ASIC) as a sampling receiver for Ultra-Wideband (UWB) Impulse Ground Penetrating Radar (I-GPR). The invention uses a unique sampling receiver design that takes advantage of the specific timing nature of I-GPR signals, i.e. cyclic equally-spaced trains of short-duration, large dynamic range and information-dense high frequency signals followed by long periods of idle time with no significant information content.

An impulse ground penetrating radar (iGPR) system is provided. The iGPR system includes a source pulser for transmitting an interrogatory pulse having period $T_{pulse}$ and an initiating trigger source for generating a trigger signal to the source pulser for initiating the interrogatory pulse transmission. The iGPR also includes a receiver having a real-time waveform sampler for portion sampling a reflected interrogatory pulse. The reflected interrogatory pulse is real-time sampled for a period $T_{win}$, where $T_{win} > T_{pulse}$.

An Application Specific Integrated Circuit (ASIC) on a small evaluation printed circuit card implements full-waveform sampling in an I-GPR receiver at a lower cost than conventional GPRs is provided. The ASIC samples the short duration and information-laden portion of the input waveform at a high speed by temporarily storing the data in a discrete-time analog-amplitude memory buffer.

A low-cost modest-performance ADC digitizes the stored voltages at a slow rate during the idle time between pulses. The ASIC has six independent channels, each capable of a real-time sampling rate of 10-15 Giga-samples per second (GBPS) with an analog bandwidth of 1.5 GHz.

An impulse ground penetrating radar (GPR) system is provided. The GPR system includes a transmitter antenna for transmitting radar signal pulses and a pulser for pulsing, the transmitter; The system includes a receiver antenna for receiving the reflected transmitted signal pulses and a sampling receiver for digitally sampling the reflected signal pulse. The system also includes a signal generator for synchronizing the pulser and the sampling receiver.

The invention is also directed towards a method for operating a ground penetrating radar. The method includes pulsing a transmitter to emit a radar frequency electromagnetic wave and receiving a reflected component of the emitted wave, wherein the reflected component includes a pulse time and idle time. The method digitally samples the reflected component during the pulse time and does not digitally sampling the reflected component during the idle time.

The invention is also directed towards an impulse ground penetrating radar (GPR) system. The GPR system includes a transmitter antenna for transmitting radar signal pulses and a pulser for pulsing the transmitter. The system also includes a receiver antenna for receiving the reflected transmitted signal pulses and a sampling receiver for digitally sampling the reflected signal pulse, wherein the sampling receiver includes a Giga Samples per Second (GSPS) sampling receiver. A signal generator synchronizes the pulser and the sampling receiver. In addition, the transmitter antenna and the receiver antenna comprise a pair of Good Impedance Match Antennas (GIMA).

BRIEF DESCRIPTION OF THE DRAWINGS

The subject matter which is regarded as the invention is particularly pointed out and distinctly claimed in the claims at the conclusion of the specification. The foregoing and other objects, features, and, advantages of the invention are apparent from the following detailed description taken in conjunction with the accompanying drawings in which:

FIG. 1 is a graphical representation of a source and received pulse timing sequence in an impulse-GPR;

FIGS. 2a and 2b are graphical representation illustrating a) equivalent sampling over multiple pulse cycles and b) real-time full wave sampling over a single cycle with fewer pulses required to sample the same information;

FIGS. 12a, 12b, and 12c are graphical representations of examples of comparison of time histories averaged over 500 nominally identical cycles: a. PSEC 4 mean time history±one standard deviation, b Acqiris mean time history±one standard deviation, c. overlay comparison of peak amplitude normalized and trigger time offset aligned mean time histories for the PSEC and Acqiris, in accordance with the invention shown in FIG. 1A;

DETAILED DESCRIPTION

The following brief definition of terms shall apply throughout the application:

The term "comprising" means including but not limited to, and should be interpreted in the manner it is typically used in the patent, context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example; and If the specification states a component or feature "may," "can," "could," "should," "preferably," "possibly," "typically," "optionally," "for example," or "might" (or other such language) be included or have a characteristic, that particular component or feature is not required to be included or to have the characteristic.

Figure 1A:
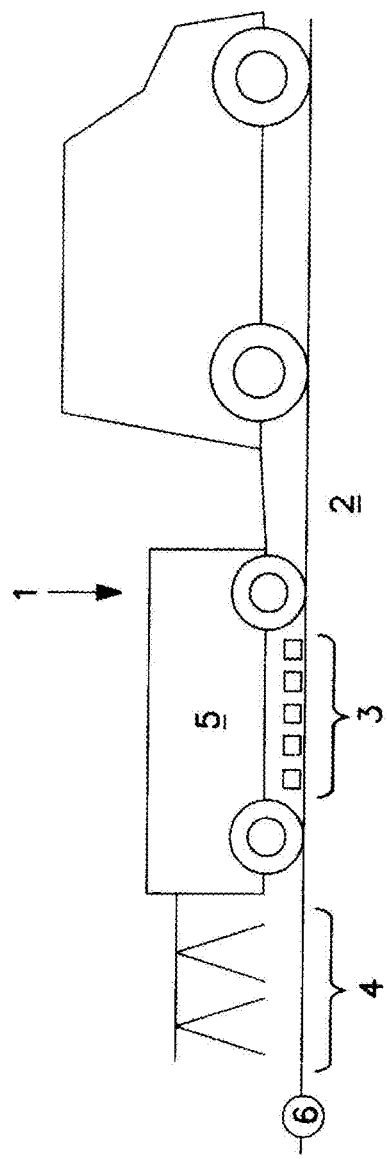
FIG. 1A is a schematic view of a ground penetrating radar system (GPR), mounted to a vehicle, positioned on a roadway.

Referring to FIG. 1A, a ground penetrating radar (GPR) system 1 is provided as a non-destructive means for determining layer velocity, depth, thickness, and condition, information relating to a roadway structure. (The term 'roadway' is to be broadly construed to denote roads, bridges and the like.)

The GPR system 1 comprises the combination of a surface-coupled assembly 5, wheel encoder 3, and an antenna or air-launched assembly 4 (including, transmit and receive antennas), mounted on a vehicle or trailer 5 for transportation over the surface 6 of the roadway 2.

Figures 3A, 3B:
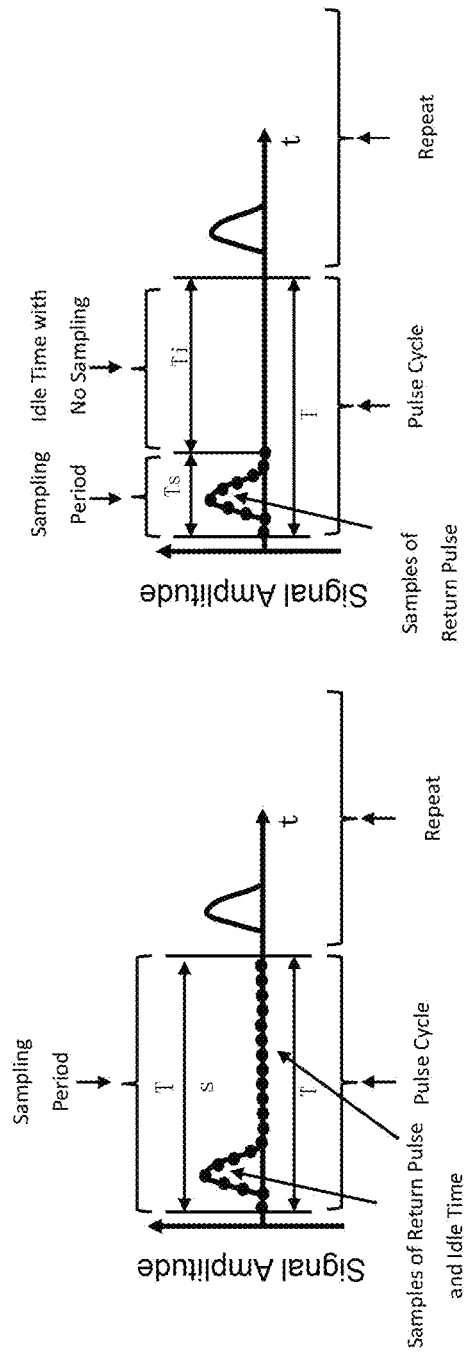
FIGS. 3a and 3b are graphical representations illustrating Full wave sampling: a.) Sampling of entire wave cycle including idle time that contains minimal information typical in the prior art; b) Sampling of information-laden short high frequency return pulse without sampling of idle time in accordance with the invention shown in FIG. 1A.

As shown in FIG. 3a and FIG. 3b, I-GPR signals are sequences of repeated cycles, each of duration T=1/PRF. A single cycle comprises a short information-laden period of length, followed, usually, by a longer idle time. The idle times carry minimal information and normally does not require acquisition or sampling.

Partial-duty-cycle full-wave sampling reduces the bandwidth requirements of the receiver by minimizing idle-time sampling. In a conventional continuous streaming data acquisition system, the sampling period equals the entire pulse cycle, as in FIG. 3a. Partial-duty-cycle full-wave sampling collects data for only a short duration of the cycle period, $T_s$, then idles for a period, $T_i$, such that $$T = T_i + T_s \quad (1)$$

As shown in FIG. 3(b) the invention samples the input waveform at high resolution and high speed for the information laden short duration portion of the pulse collection cycle and avoids sampling during the idle time.

The digital data bandwidth, $D_{BW}$, in terms of bytes per time for a generic 1-GPR receiver is $$D_{BW} = N_S \times PRF \times N_B \quad (2)$$

$N_S$ is the number of samples/cycle and $N_B$ is the number of bytes/sample. For sub sampling, $N_S = 1$ and $$D_{BW}(\text{Sub sampling}) = 1 \times PRF \times N_B \quad (3)$$

For streaming full wave sampling of the entire waveform including, idle time $$D_B(\text{Fullwave including idle}) = N_C \times PRF \times N_B \quad (4)$$

For partial duty-cycle full wave sampling of the return pulse without the idle time $$D_{BW}(\text{Fullwave without idle}) = N_C \times \left(\frac{T_S}{T}\right) PRF \times N_B \quad (5)$$

The reduction in bandwidth is proportional to the amount of the cycle dedicated to idling.

EXAMPLE

Figure 4:
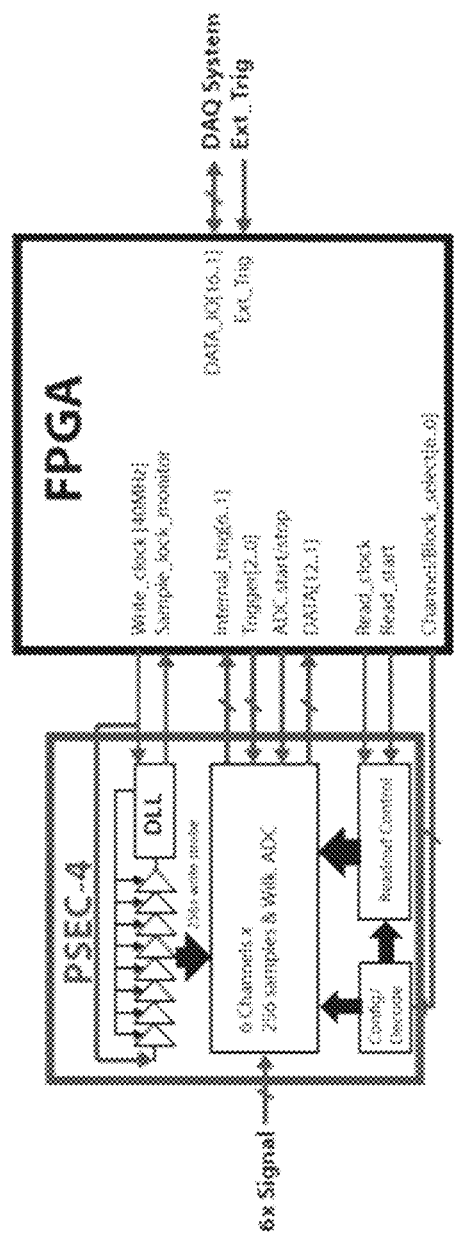
FIG. 4 is a block diagram of one example of architecture overview and functional control of an Application Specific Integrated Circuit (ASIC) and floating point gate array (FPGA) control.

A receiver selected for implementing partial duty cycle real time full wave sampling was an evaluation board containing a single PSEC4 15 Giga Samples per Second (GSPS) analog-buffered full waveform sampling ASIC, see FIG. 4. The PSEC4 consists of six input channels each having a dedicated bank with a depth-count of 256 sample-and-hold switched capacitor circuits and one ADC.

Figure 5:
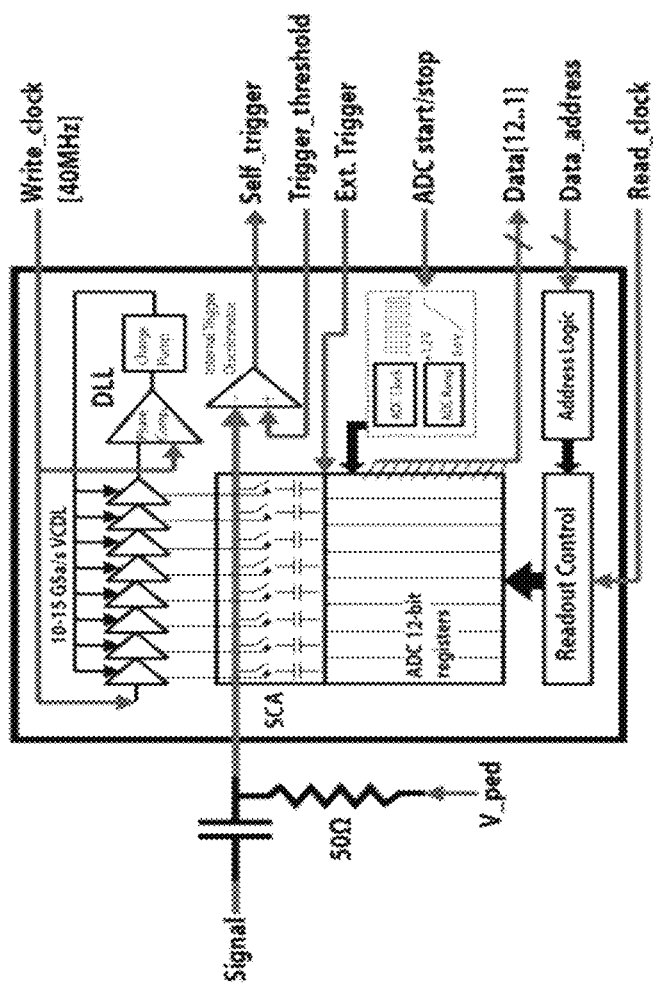
FIG. 5 is a block diagram of the example shown in FIG. 4, using an ASIC.

FIG. 5 shows an overview of the architecture of a single channel of PSEC4. For simplicity only 8 cells of the 256 analog memory cells are illustrated. The input signal is stored in the memory cells and digitized by the ADC and stored in 12-bit registers. The registers are read out after all the memory cells are digitized.

In this example an Evaluation Card uses a Cyclone III Altera FPGA (EP3C25Q240), a universal serial bus (USB) 2.0 interface, DC power input and a BNC external trigger connector.

Figure 6:
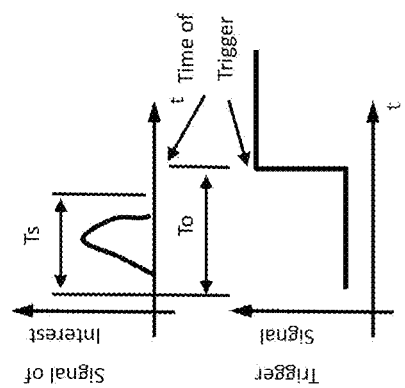
FIG. 6 is a graphical representation illustrating Timing of trigger, pre-trigger sampling and trigger offset.

As shown in FIG. 6, the system samples the input waveform continuously and stores the data temporarily in a pre-trigger buffer by continually overwriting the analog data stored in the 256 sampling SCA cells. The collected data consequently correspond to the waveform received prior to the receipt of the trigger signal. $T_o$ is the offset time between receipt of the trigger and start of the data sample buffer.

A custom I-GPR system served as a testbed for evaluating receiver performance. This testbed is capable of using either the PSEC4 waveform-sampling receiver or an Acqiris 10-bit 8 Giga Samples per Second (GSPS) 1.5 GHz bandwidth streaming receiver. The Acqiris is a commercially available system capable of sampling a single channel at 8 GSPS in a streaming mode that provides a baseline for comparison to the PSEC4. The internal architecture uses a gang of synchronized interleaved ADCs to achieve the high-speed continuous streaming sampling. The nominal performances of the Acqiris and PSEC4 are comparable, with the primary differences being the Acqiris can sample continuously, while the PSEC4 samples intermittently; and the Acqiris can sample only a single channel, while the PSEC4 can sample 6 channels with the possibility for scaling up to many more channels. It will be appreciated that any suitable waveform sampling receiver may be used.

Figure 7:
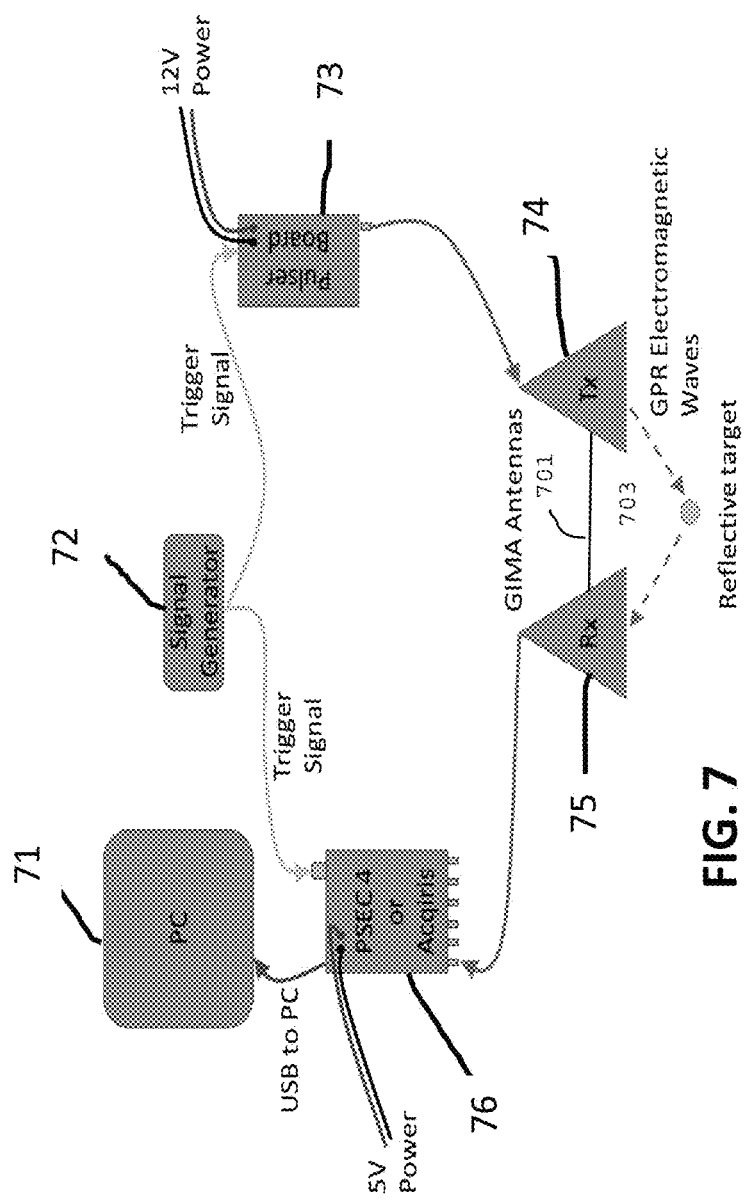
FIG. 7 is an operational schematic of an I-GPR receiver testbed example.

A schematic diagram of the testbed appears in FIG. 7. A square wave signal generator 72 running at a PRF of 50 kHz simultaneously sends a rising edge trigger signal to the sampling receiver 76 (Acqiris or PSEC4 in this example) and to a custom CMOS-based UWB pulser 73.

Still referring to FIG. 7, pulser 73 may be any suitable pulser meeting the requirements of Federal Communications Commission (hereinafter referred to as "FCC") regulations for UWB technology.

Specifically, the FCC requires that transmitted UWB pulses should observe strict limitations in terms of a pulse bandwidth and amplitude. The emissions of radio frequency devices generally are regulated by Part 15 of Title 47 of the Code of Federal Regulations ("C.F.R."). Subpart F, in particular, entitled "Ultra-Wideband. Operation," and found at 47 C.F.R. §§ 15.501-15.525, recites regulations that specifically restrict the emissions of UWB devices. Among those regulations, the FCC sets forth frequency masks for UWB devices in particular applications, namely "ground penetrating radars and wall imaging systems" (§ 15.509); "through-wall imaging systems" (§ 15.510); "surveillance systems" (§ 15.511); "medical imaging systems" (§ 15.513); "vehicular radar systems" (§ 15.515); "indoor UWB systems" (§ 15.517); and "hand held UWB systems" (§ 15.519). These frequency masks are incorporated herein by reference. Further limitations and measurement requirements are set forth in § 15.519, "Technical requirements applicable to all UWB devices," also incorporated herein by reference.

Still referring to FIG. 7, pulser 73 may include four Gaussian-like pulse generators that generate pulses at different time offsets. The resulting four Gaussian-like pulses are combined to generate a UWB pulse that approximates the fifth derivative of a Gaussian pulse.

In another embodiment, pulser 73 may include a sequence control stage, a pulse generation stage, and an output stage. The sequence control stage receives a pulse enable signal and generates output signals with different time offsets at a plurality of output branches. The pulse generation stage includes a plurality of pulse generators, wherein each pulse generator is coupled to an output branch of the sequence control stage and generates a Gaussian-like pulse at its respective time offset. The output stage combines the generated pulses into an ultra-wideband pulse. Preferably, the pulses are timed in such a way as to approximate a derivative of first or higher order of the Gaussian pulse. In one embodiment, four Gaussian-like pulses may be combined to approximate the fifth derivative of the Gaussian pulse.

Still referring to FIG. 7, FIG. 7 shows three principal paths of radar waves in a ground penetrating radar: 1. Direct coupling 701, 2. Ground bounce 702, and 3. Subsurface feature reflection 703. The timing of the difference between the direct coupling 701 and ground bounce 702 indicates the height and relative position of the source and receive antennas. The timing of the difference between the ground bounce 702 and subsurface feature reflection 703 indicates the depth and position of the feature. The timing of the start of the data acquisition window 7A6 is often uncertain with jitter variability that prevents its use for locating objects and stacking multiple waveforms together to construct a 2-D or 3-D rendering of subsurface features. The timing of the direct coupling signal 701 relative to the ground bounce 702 and subsurface feature reflection signal 703 has much smaller variability and is an effective landmark for setting timing (see FIG. 7C).

Figure 7A:
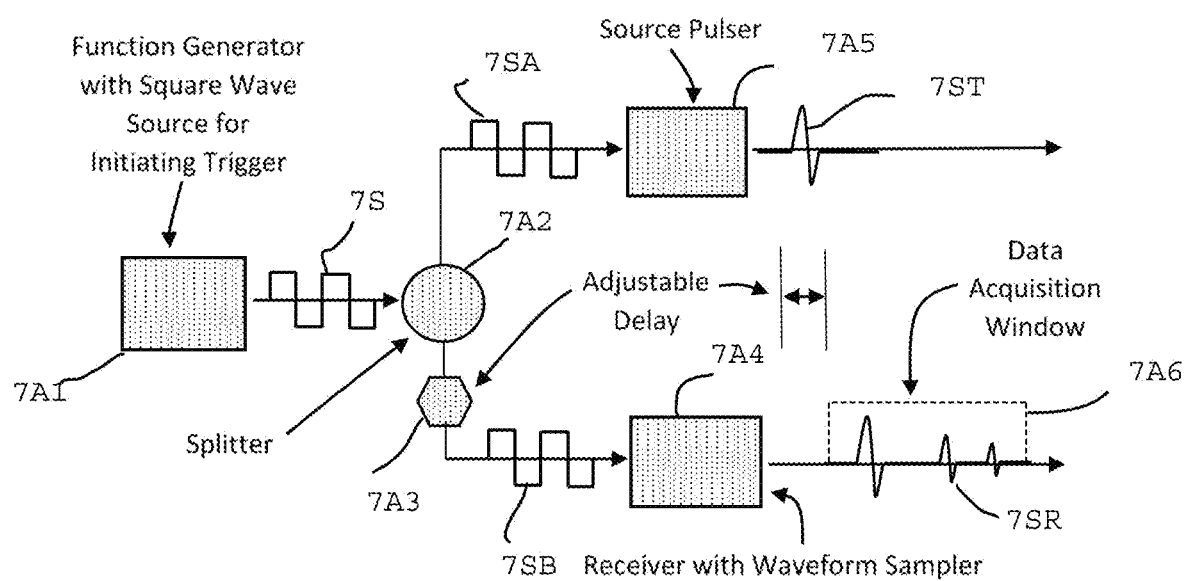
FIG. 7A is block diagram of an initiating trigger with adjustable delay to set the timing of waveform sampling window relative to source pulse in accordance with the present invention.
Figure 7B:
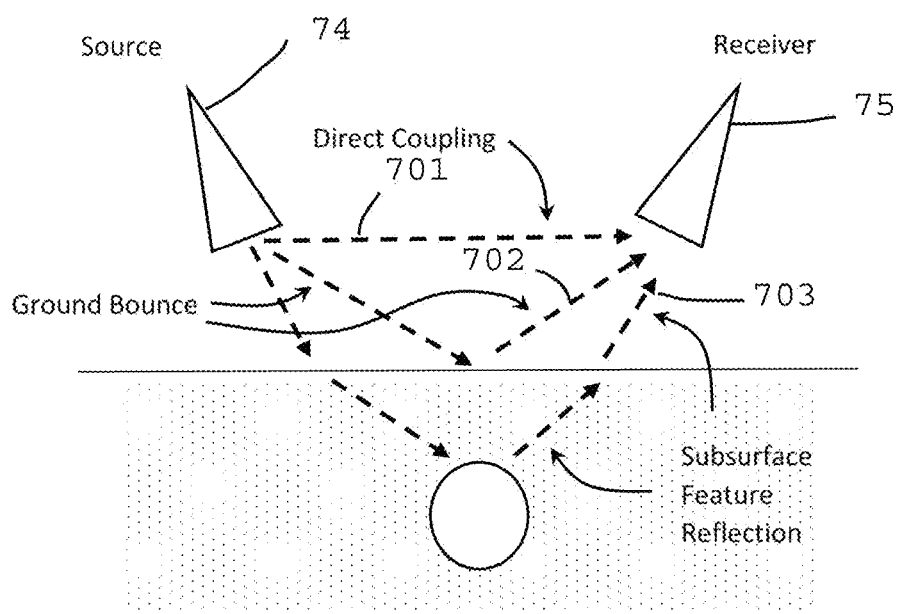
FIG. 7B is a block diagram of the geometry of ground penetrating radar signal paths showing direct coupling, ground bounce and subsurface feature reflection signals in accordance with the present invention.
Figure 7C:
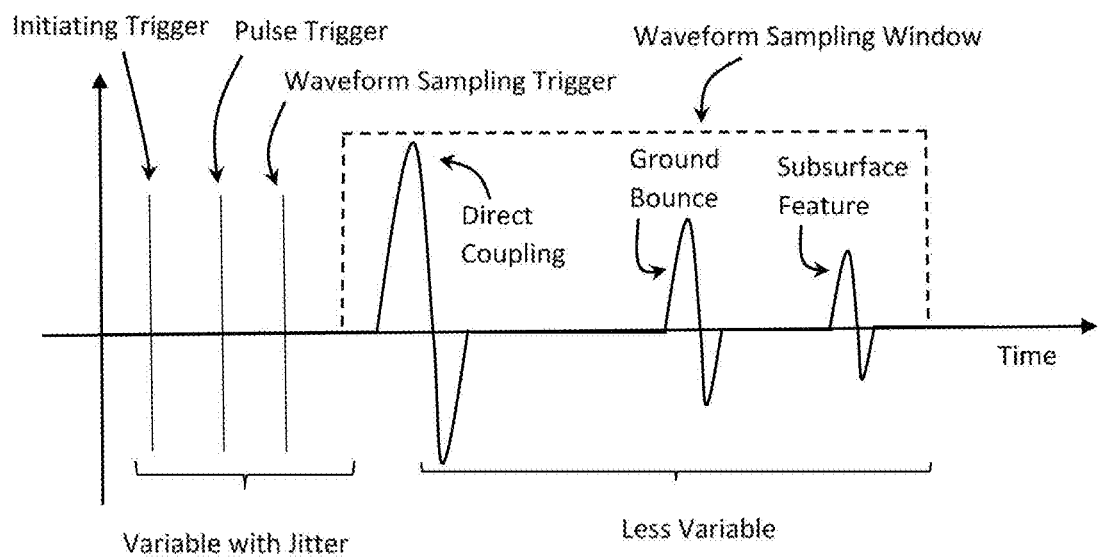
FIG. 7C is a graphical representation of timing of trigger signals with timing variability due to jitter compared with radar signals with less relative timing variability in accordance with the present invention.

Referring also to FIG. 7A there is shown a block diagram of an initiating trigger with adjustable delay to set the timing of waveform sampling window relative to source pulse in accordance with the present invention. Function generator 7A1 generates signal 7S. Splitter 7A2 splits signal 7S to signals 7SA and 7SB. Signal 7SA triggers source pulser 7A5 to radiate or transmit signal 7ST.

Still referring to FIG. 7A, signal 7SB, delayed by adjustable delayer 7A3 for 10-500 nanoseconds, triggers receiver 7A4 to begin sampling for a fixed time, i.e., the Data Acquisition Window 7A6 shown in FIG. 7A, the information portion of received (e.g., reflected and/or refracted signal 7ST) signal 7SR. Alternatively, Data Acquisition Window 7A6 may be initiated by a direct coupling signal (FIG. 7-701).

The tests initially were a bi-static configuration, i.e. a single source antenna and a separate single receive antenna. A pair of Good Impedance Match Antennas (GIMA) 74,75 transmitted and received the signals. Good Impedance Matching Antenna (GIMA), has been developed for use in Ground Penetrating Radar (GPR) NDE of concrete structures. The requirements of a useful GPR antenna are that it provides sufficient penetrating depth in the concrete with sufficient resolution to determine the location and magnitude of the defects, such as deterioration and delamination. The GIMA antenna is designed to have a self-defined aperture that minimizes impedance mismatching at the aperture. This unique feature allows the antenna to be used in various frequency bands. The tested frequency range is from 500 MHz to 16 GHz. The antenna provides a high penetrating depth (more than 330 mm) and the sufficient resolution of the image that can recognize cracks up to 1 mm thick, with a radiation coefficient of about 99%. In addition, the aperture reflection is determined via the time-domain air shot reflections.

Figure 8:
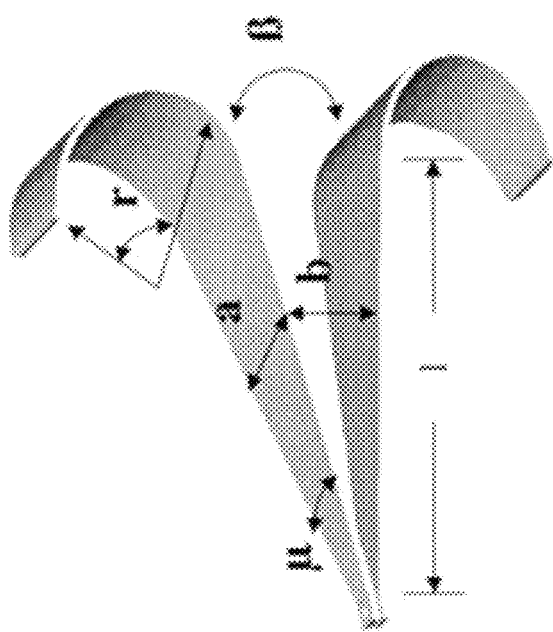
FIG. 8 is a pictorial illustration of a Good Impedance Matching Antenna.

To have the maximum power transmitted onto the object under inspection, the GPR antennas need to have good impedance matching to minimize the internal reflections and to smooth out the transition from the circuit impedance, 50 V, to the free space impedance, 377 V. As shown in FIG. 8, the GIMA antennas (FIG. 7-74,75) appears as a waveguide with two metal conductors of varying widths that are separated by an insulator. FIG. 8 illustrates the shape and the critical dimensions of the GIMA antenna where $\mu=13°$, $\beta=6°$, $r=150°$, $a=60$ mm, $b=60$ mm, and $1=180$ mm.

A computing device 71 offloads the data from the sampling receiver 76 via a data link—Ethernet for the Acqiris and USB for the PSEC4. It will be understood that any suitable datalink may be used, for example Bluetooth or other wireless datalinks may be used.

The testbed fits into a small vehicular tow trailer, (see FIG. 1A-5). The system 1 collected data in three different bi-static target configurations, as shown in FIG. 9: a. Metal plate 9a2 resting on concrete floor 9a1; b. Bare concrete floor 9a1; and, c. 25.4 mm diameter steel bar 9a3 resting on concrete floor 9a1 with the transmit 74 and receive 75 radar in constant velocity horizontal movement.

Figure 9A:
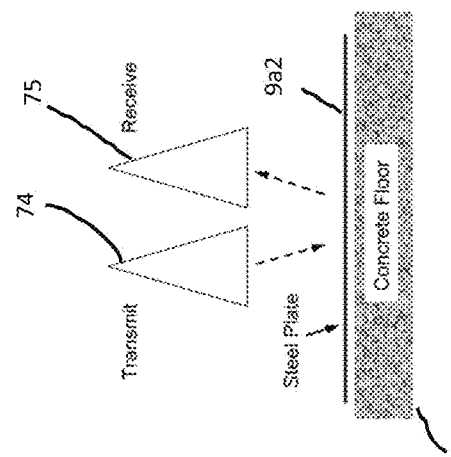
FIGS. 9a, 9b, and 9c are graphical representations of ground penetrating examples of bistatic radar test configurations, in accordance with the invention shown in FIG. 1A: a. Antennas stationary over steel plate on concrete floor, b, Antennas stationary over bare concrete floor, and c. Antennas moving horizontally at constant speed with 25.4 mm steel cylinder on concrete floor.

Initial tests measured individual time domain traces, i.e. A-scans, of the reflections off of the metal plate 9a2 placed under the system 1, in the setup of FIG. 9a.

Figure 10A:
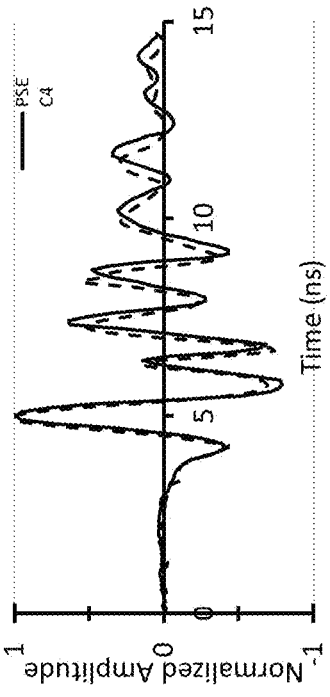
FIGS. 10a, 10b, and 10c are graphical representations of examples of A-scan data from metal plate collected with a. PSEC4, b. Acqiris, and c. Overlay of PSEC4 and Acqiris using normalized amplitudes and time shift to align maximum values, in accordance with the invention shown in FIG. 1A.
Figure 10B:
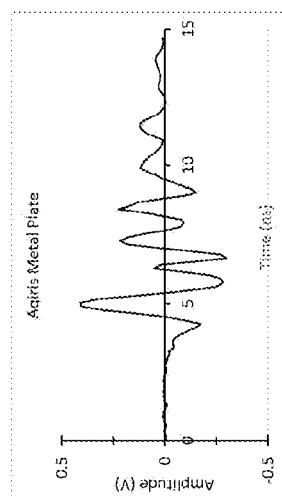
Figure 10C:
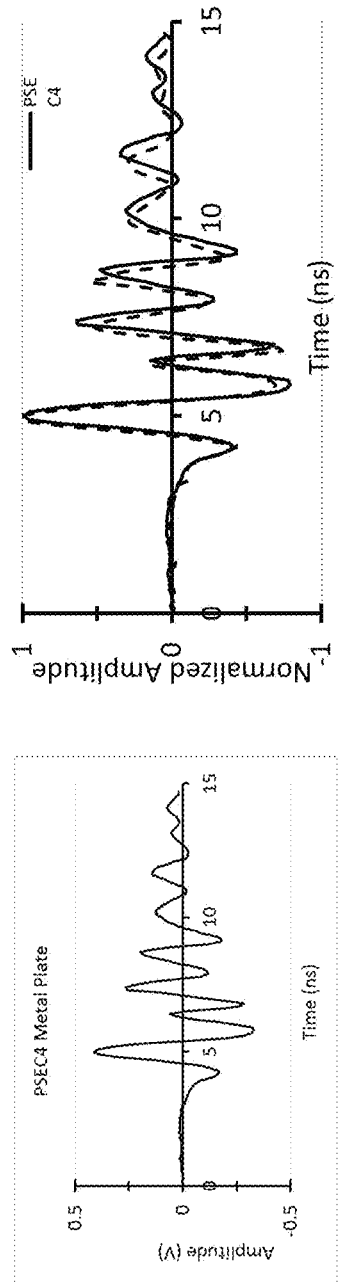

FIGS. 10a and 10b show typical A-scan data collected by the PSEC4 and Acqiris, respectively, under nominally identical conditions. FIG. 10c is an overlay of the two A-scan traces, with the time shifted and amplitudes normalized to match the maximum amplitude points occurring at 5 ns.

The next series of tests examined the cyclic acquisition capabilities of the receivers. The tests collected a series of time traces as the system 1 is in either a stationary or slowly-varying configuration. The B-scan is a condensed image-based representation of a set of A-scan traces. Each individual column in the B-scan image contains the data of a single A-scan with positive time flowing down and the amplitude encoded on a gray scale from white to black.

Figure 9B:
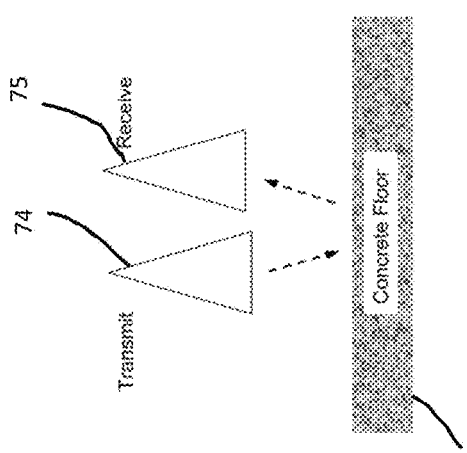
Figure 9C:
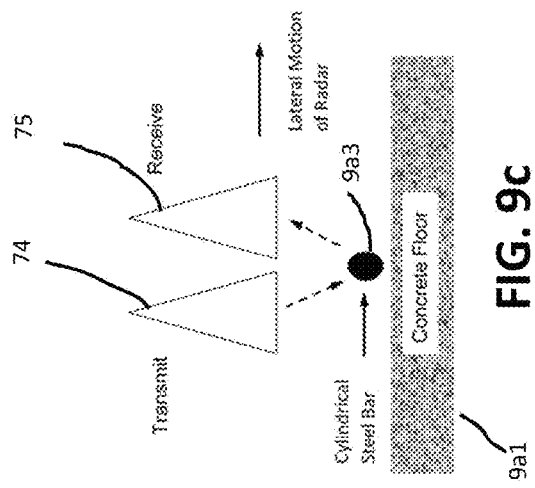

The initial B-scan measurements placed the antenna stationary above a concrete floor 9a1, as in FIG. 9b, and collected data from a set of 500 cycles under nominally identical conditions. An initial examination of the data found that the PSEC4 has a cyclic variation in the trigger timing offset. This variation was identified and removed in software using the direct-coupling peak, i.e. first large amplitude peak, in the signal as a timing landmark.

Figure 11B:
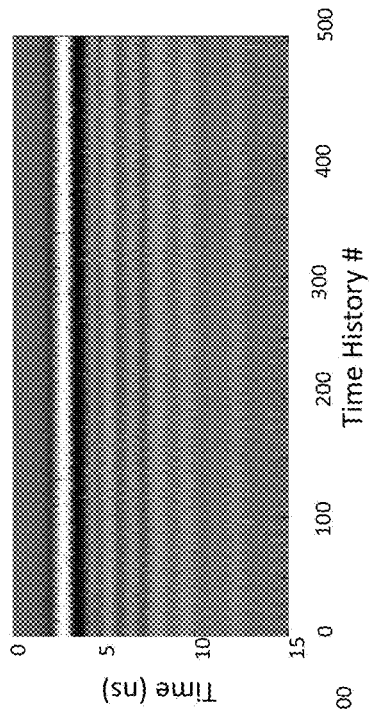
FIG. 11a and FIG. 11b are graphical representations of examples of B-scans collected from a bare concrete floor with the I-GPR testbed tow cart held stationary, a. B-scan of concrete floor repeats collected with PSEC4, and b. Acqiris B-scan of concrete floor, in accordance with the invention shown in FIG. 1A.
Figure 11A:
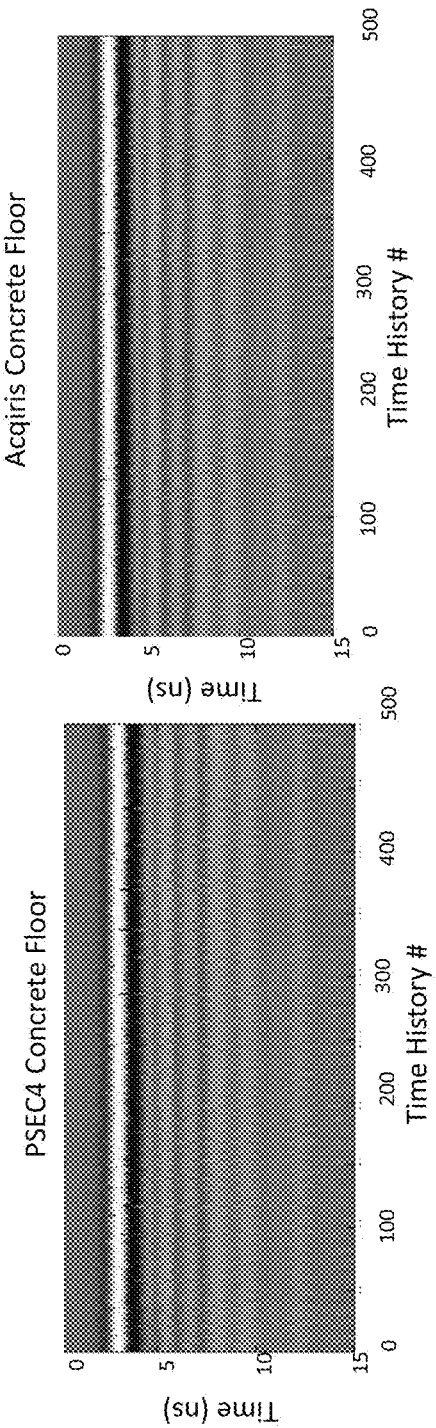

FIG. 11 shows a B-scan of the data collected with the PSEC4. The bright white line corresponds to the direct coupling signal. FIG. 11b shows a B-scan collected with the Acqiris, under nominally identical test conditions. Further analysis of this data set evaluated the repeatability and noise in the measurement systems by first calculating the mean of the time histories across the repeats and then the standard deviation.

Referring also to FIGS. 12a-c, there is shown a comparison of time histories averaged over 500 nominally identical cycles: FIG. 12a and FIG. 12b show the mean time history and the mean time history± one standard deviation for the PSEC4 and Acqiris systems, respectively. FIG. 12c is an overlay of the amplitude normalized and time shift aligned mean time histories for the PSEC4 and Acqiris.

The next set of tests evaluated the capability of the receivers to detect isolated features. The test protocol was to place two no. 6 steel reinforcing bars (nominal diameter of 79.1 mm (⅝ in.)) on a concrete floor and to collect I-GPR data while manually towing the cart FIG. 1A-5 at a walking pace over the rebars, collecting a sequence of A-scan traces, assembling into a B-scan, and conditioning the B-scans by removal of the background traces.

Figures 13A, 13B:
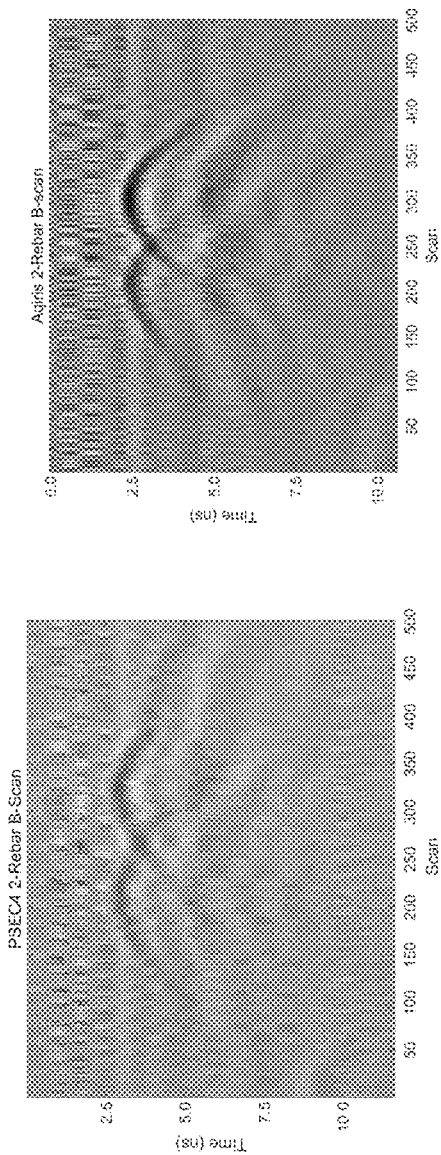
FIG. 13a and FIG. 13b are graphical representations of examples of B-scans of two steel reinforcing bars on a concrete floor taken with a. PSEC-4 and b. Acqiris, in accordance with the invention shown in FIG. 1A.

Typical results appear in FIG. 13a and FIG. 13b with a. PSEC4 and b. Acqiris. Hyperbolas corresponding to the individual bars, are visible in both images. A visual examination indicates that the hyperbolas from the Acqiris are a smoother and more symmetric than those from the PSEC4. This is likely a consequence of the difference in triggering modes between the systems.

The Acqiris data collection used the wheel encoder (FIG. 1-3) to trigger pulse and data acquisition cycles. The PSEC4 data acquisition used fixed time intervals for triggering and was subject to variability in walking speeds. The B-scan from the Acqiris had a moderately better contrast than the PSEC4. Calculating image statistics in terms of histogram, standard deviation and entropy provides, some more insight into the contrast and texture of images. Both B-scans used a 0-255 gray scale intensity representation.

Figure 14A:
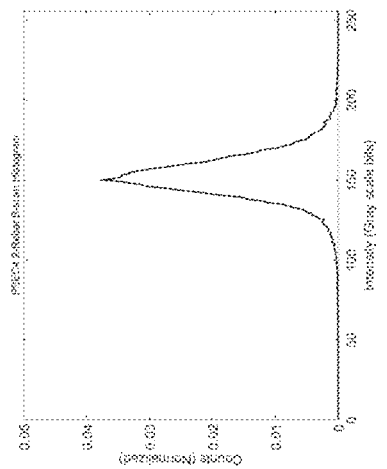
FIG. 14a and FIG. 14b are graphical representations of examples of B-scans collected from two rebars on concrete floor while moving the I-GPR cart at constant speed producing hyperbolas, in accordance with the invention shown in FIG. 1A.
Figure 14B:
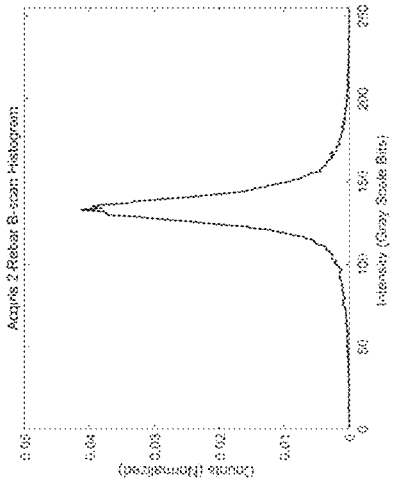

FIG. 14a and FIG. 14b show the intensity histograms for the images with a. PSEC4 and b. Acqiris. The mean, standard deviation, and image entropy of the B-scan intensities are 151.9, 14.9 and 2.98e-04 for the PSEC4; and 132.8, 19.0 and 3.96e-04 for the Acqiris respectively. The standard deviation is a measure of the dynamic range spread of the data, with larger standard deviations corresponding to a larger use of the available dynamic range of the instrument. The entropy is a measure of the texture in the signal with larger values of entropy corresponding to increased amounts of texture in the image.

Figure 16:
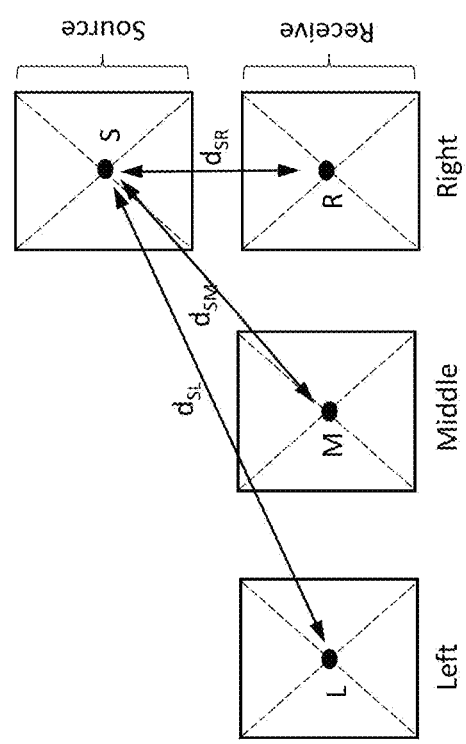
FIG. 16 is a graphical representations of examples of top view geometry of multi-static test showing source to receive antenna direct coupling distances, in accordance with the invention shown in FIG. 1A.

The final series of tests evaluated the multichannel receiver performance of the PSEC4 with multi-static single antenna launch and three-antenna receive measurements. FIG. 16 shows the antenna configuration with the launch antenna placed asymmetrically with a lateral offset to the right relative to a linear array of three receive antennas: dSL=115 mm, dSM=75 mm, and dSR=50 mm The corresponding dimensions appear in FIG. 16. Upon launching a single pulse from the source antenna, the signal travels through direct coupling and surface reflection paths of different lengths according to receiver antenna position relative to the launch antenna. The PSEC4 collects the A-scan traces from the three antennas as full wave forms simultaneously, i.e. in a multi-static configuration.

Figure 17C:
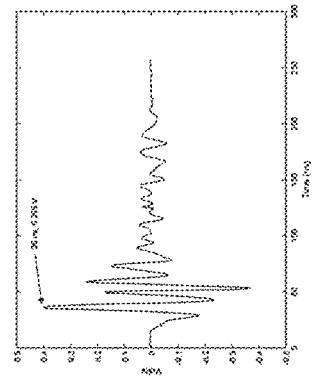
FIGS. 17a, 17b, and 17c are graphical representations of examples of transient time histories collected with antenna array in a multi static configuration, in accordance with the invention shown in FIG. 1A.
Figure 17B:
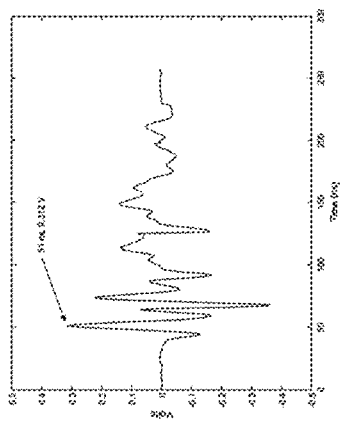
Figure 17A:
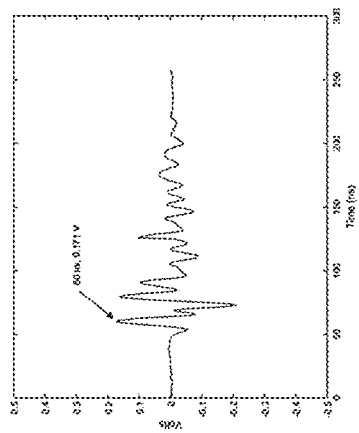

The results appear in FIG. 17 with the amplitude of the received signal decaying and the time delay of arrival increasing with the distance of the source to the receive antenna. Transient time histories collected with antenna array in a multi-static configuration shown in FIG. 16 measures full waveforms simultaneously for reflection from a concrete floor with a steel reinforcing bar target (e.g., as shown in FIG. 9). The initial peak noted with time and amplitude is due to direct coupling, between source and receive antennas: a. left antenna, b. middle antenna and c. right antenna.

Figure 15:
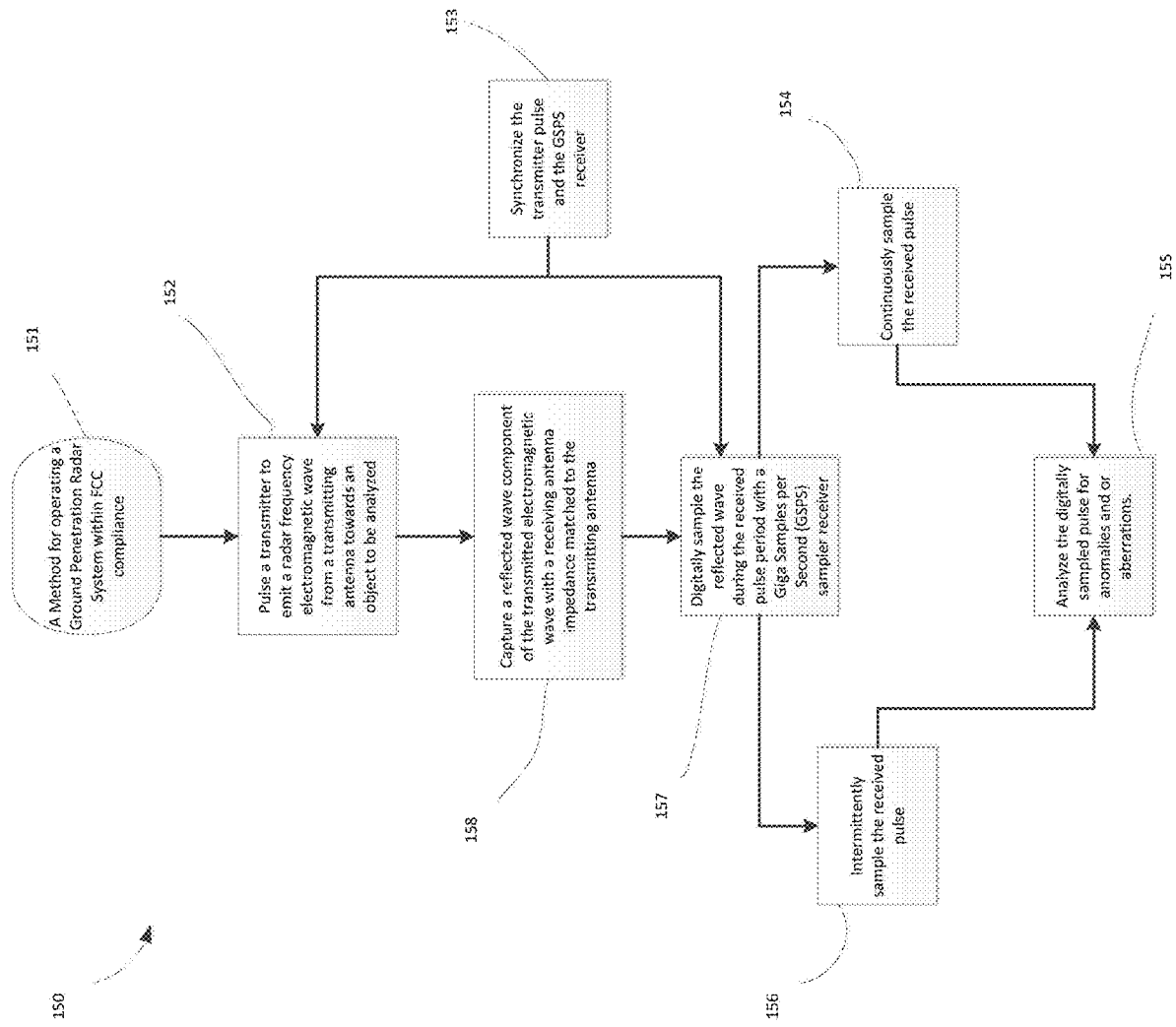
FIG. 15 is a flow chart for one method of operating a ground penetrating radar system in accordance with the invention shown in FIG. 1A.

Referring also to FIG. 15 there is shown a flow chart for one method 150 of operating a ground penetrating radar system in accordance with the invention shown in FIG. 1A. a transmitter is pulsed to emit a radar frequency electromagnetic wave from a transmitting antenna towards an object to be analyzed 152. A reflected wave component of the transmitted electromagnetic wave is received or captured with a receiving antenna impedance matched to the transmitting antenna 158. Next, digitally sample the reflected wave during the received pulse period with a Giga Samples per Second (GSPS) sampler receiver 157.

Synchronize the transmitter pulse and the GSPS sampling receiver 153. It will be understood that any suitable method for synchronization may be used. Such as, for example, fixed time intervals or mechanical methods such as a wheel encoder as shown in FIG. 1A.

In one embodiment, continuously sample the received pulse 154 and in an alternate embodiment intermittently sample the received pulse 156. Analyze 155 the digitally sampled pulse for anomalies and or aberrations, such as, for example concrete fractures, voids, or rebar condition.

It will be appreciated that novel features of a low cost, real-time full waveform sampling ASIC test card as a UWB I-GPR receiver is, disclosed herein. In comparison with prior art the invention disclosed herein offers the following advantages and features: 1. An invention utilizing, discrete analog buffers combined with a slow rate ADC to achieve single shot high resolution full waveform sampling. The invention avoids using multiple pulse signal cycles to construct just one output pulse signal and avoids using an expensive high-speed streaming ADC system; 2. The single-shot real-time sampling feature with six channel receivers per ASIC, expandable to multiple ASICS, enables wide horizontal detection coverage during GPR surveys.

It should be understood that the foregoing description is only illustrative of the invention. Thus, various alternatives and modifications can be devised by those skilled in the art without departing from the invention. Accordingly, the present invention is intended to embrace all such alternatives, modifications and variances that fall within the scope of the appended claims.

What is claimed is:

1. An impulse ground penetrating radar (iGPR) system, the iGPR system comprising:
    a source comprising:
        a source pulser for transmitting a pulse having period $T_{pulse}$;
        an initiating trigger source for generating a trigger signal to the source pulser for initiating the pulse transmission
    a receiver comprising:
        a real-time waveform sampler for portion sampling a reflected pulse;
        and wherein the reflected pulse is real-time sampled for a period $T_{win}$, where $T_{win}<T_{pulse}$;
    wherein the initiating trigger source is connectable to the real-time pulse sampler for initiating sampling the reflected pulse; and
    an adjustable delayer for delaying the trigger signal to the real-time waveform sampler.

2. The iGPR as in claim 1 wherein the adjustable delayer comprises a transmission cable.

3. The iGPR as in claim 1 further comprising a trigger circuit connectable to the real-time pulse sampler for initiating a sampling trigger for sampling the reflected pulse.

4. The iGPR as in claim 3 wherein the trigger circuit derives the sampling trigger from the reflected pulse.

5. The iGPR as in claim 1 further comprising a trigger circuit connectable to the real-time pulse sampler for initiating a sampling trigger for sampling the reflected interrogatory pulse.

6. The iGPR as in claim 5 further comprising a direct coupling signal between the source and the receiver.

7. The iGPR as in claim 1 wherein the real-time waveform sampler comprises:
    a plurality of sequentially connected delay elements for generating a plurality of sequentially delayed write strobe signals;
    a write clock connectable to at least one of the plurality of sequentially connected delay elements, wherein the write clock generates a clock signal at a predetermined frequency $f_{write}$ to at least one of the sequentially connected delay elements, wherein each of the sequentially connected delay elements delays the clock signal $(1/f_{write})/K$, where K=the plurality of sequentially connected delay elements;
    a plurality of sampling switches, each of the plurality of sampling switches corresponding to an output of the plurality of delay elements;
    a plurality of sampling charge storage elements corresponding to the plurality of sampling switches, and wherein the plurality of sampling charge storage elements sequentially sample a portion of the reflected pulse;
    and wherein $T_{win}=1/f_{write}$.

8. The iGPR as in claim 7 wherein the plurality of sampling charge storage elements further comprises a corresponding plurality of charge capacitors.

9. The iGPR as in claim 7 further comprising an Analog-Digital Convener (ADC) connected to each of the plurality of sampling charge storage elements.

10. The iGPR as in claim 9 further comprising:
    a data register connected to the ADC;
    a readout controller connected to the data register; and
    a decoder connected to the data register.

11. A method for operating a ground penetrating radar, the method comprising:
    pulsing a transmitter to emit a radar frequency electromagnetic wave;
    providing a receiver for receiving a reflected signal of the emitted wave, wherein the reflected signal comprises an information segment and a no-information segment;
    digitally sampling the information segment; and
    not digitally sampling the no-information segment;
    wherein digitally sampling the information segment further comprises digitally sampling the information segment with a Giga Samples per Second (GSPS) sampling receiver.

12. The method as in claim 11 wherein digitally sampling the information segment comprises intermittently sampling the information segment.

13. The method as in claim 11 wherein digitally sampling the information segment further comprises continuously sampling the information segment.

14. The method as in claim 11 further comprising synchronizing the pulsing of the transmitter and the digital sampling of the information segment.

15. The method as in claim 14 further comprising providing a direct coupling signal between the transmitter and the receiver for synchronizing the pulsing of the transmitter and the digital sampling of the information segment.

16. An impulse ground penetrating radar (GPR) system, the GPR system comprising:
    a transmitter antenna for transmitting radar signal pulses;
    a pulses for pulsing the transmitter;
    a receiver antenna for receiving the reflected transmitted signal pulses;
    a sampling receiver for digitally sampling an information portion of the reflected signal pulse, wherein the sampling receiver comprises:
        a Giga Samples per Second (GSPS) sampling receiver;
        a signal generator for synchronizing the pulser and the sampling receiver; and
    wherein the transmitter antenna and the receiver antenna comprise a pair of Good Impedance Match Antennas (GIMA);
    wherein the sampling receiver comprises a continuous sampler.

17. The system as in claim 16 wherein the sampling receiver comprises an intermittent sampler.

\* \* \* \* \*